United States Patent Office 3,379,772
Patented Apr. 23, 1968

3,379,772
PROCESS FOR THE PRODUCTION OF
DIMETHYL CHLOROACETAL
Frederick Grosser, Midland Park, N.J., assignor to General Aniline & Film Corporation, New York, N.Y., a corporation of Delaware
No Drawing. Filed Nov. 10, 1965, Ser. No. 507,227
5 Claims. (Cl. 260—615)

ABSTRACT OF THE DISCLOSURE

In the production of acetals of beta-haloaldehydes by the reaction of α,β-ethylenically unsaturated ether with an alkyl alcohol and chlorine or bromine in the presence of an alkaline agent, a substantial improvement in yield of purer product and reduction of byproduct formation, with a decrease in the amount of alkali and chlorine or bromine required, is obtained by employing as the alkaline agent calcium oxide having a particle size so that 100% thereof passes through a 150-mesh screen.

---

The present invention relates to an improved process for the production of acetals of β-haloaldehydes.

It is an object of this invention to provide an improved process for the production of acetals of β-haloaldehydes which is simple and expedient to carry out on a commercial scale and which eliminates difficulties encountered in the production of the desired final product. Such difficulties which may be mentioned and heretofore have not been adequately solved are the length of the reaction time, the cost of reactants, the formation of by-products, the prevention of hydrolysis of the starting materials and the control of reaction temperature. Other objects of this invention will appear hereinafter.

In order to overcome the above-mentioned difficulties which have confronted experimenters in this field, it has been advanced, as shown by U.S. Patent 2,550,637, that acetals of β-haloaldehydes was a substantial contribution an α,β-ethylenically unsaturated ether with a halogen, such as chlorine or bromine, an alcohol and an alkaline agent.

While the discovery that general alkaline agents, such as sodium hydroxide, may be used in the production of acetals of β-haloaldehydes was a substantial contribution to the art, nonetheless, many aspects of the basic process have remained unsolved.

I have now discovered that the above mentioned difficulties may be eliminated by use of calcium oxide, CaO, having a particle size so that 100% of the calcium oxide will pass a 150 to 325 mesh screen, as the alkaline agent in the production of acetals of β-haloaldehydes. Particularly beneficial results have been obtained by using calcium oxide in a particle size so that 100% of it will pass through a 200 mesh screen. That calcium oxide of this particular particle size may be used to produce such beneficial results is most surprising, since not just any particle size of calcium oxide may be used. For example, if the particle size of calcium oxide is such that 100% of it passes a 20 mesh screen, the reaction doesn't proceed satisfactorily, i.e., the reaction mixture becomes acidic after less than 10% of the required amount of chlorine has been added. When this occurs, the reaction must be terminated, because under acidic conditions the highly explosive methyl hypochlorite is formed. Obviously, with only 10% of the required amount of chlorine added, the yield of desired product is very low.

The objects of this invention may be accomplished in general by reacting and α,β-ethylenically unsaturated ether with a halogen, such as chlorine or bromine, an alcohol and calcium oxide of the required particular particle size. The reaction proceeds as indicated by the following reaction:

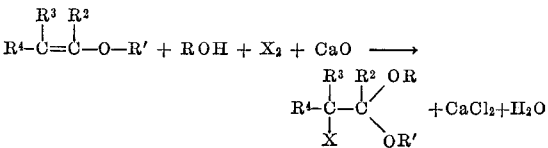

wherein R represents the residue of an aliphatic alcohol and R′ is a radical of an alcohol or phenol, including oxygen or sulfur-interrupted hydrocarbon radicals, $R^2$, $R^3$ and $R^4$ stand for hydrogen or hydrocarbon radicals, and X stands for halogen.

As indicated above, the α,β-ethylenically unsaturated ether employed in the present invention may be any one of a wide variety of compounds of this type. As specific compounds of this type may be mentioned the methyl-, ethyl-, propyl-, isopropyl-, n-butyl-, isobutyl-, tert. butyl-, dodecyl-, octadecyl-, phenyl-, cresyl-, and benzyl-ethers of such α,β-ethylenically unsaturated alcohols as vinyl-, isopropenyl-, butenyl-, α-phenyl vinyl-, or β-phenyl vinyl-alcohol and the like. Likewise, compounds such as β-methoxy ethyl vinyl ether and β-methyl thioethyl vinyl ether may be employed, if desired.

From a consideration of the nature of the reaction, it will be apparent that the particular β-haloaldehyde whose acetals are prepared will depend on the particular ethylenically unsaturated alcohol whose ether is employed as a reactant. The present invention is of particular interest for the production of acetals of β-haloacetaldehyde in which $R^2$, $R^3$ and $R^4$ are hydrogen and for its production the vinyl ethers of the formula

in which $R^2$, $R^3$ and $R^4$ are also hydrogen will be employed as a reactant and from a technical standpoint the lower alkyl (methyl-, ethyl-, and up through butyl-) vinyl ethers are of particular interest.

It will also be apparent that the alcohol employed as a reactant in the present invention will depend on the particular acetal which is desired as a product. In general, the symmetrical lower alkyl acetals are preferred and therefore the alcohol employed will generally correspond to the alcohol component of the ethylenically unsaturated ether and will thus be a lower aliphatic alcohol such as methyl or ethyl. However, higher aliphatic alcohols, such as dodecyl- or octa-decyl- alcohol and the like can be employed, if desired.

The striking advantages of my invention are most surprising, since the limited solubility of calcium oxide in alcohol (for example, 0.2 g. per 100 ml. in methanol) would seem to indicate that its use would not be practical. Nonetheless, experiments show that my instant invention with only a very low reaction time results in such further advantages as to considerably lessen the cost of the process, since smaller amounts of raw materials are required and by-products, such as highly explosive methyl hypochlorite, and undesirable chloroform, are not formed. Furthermore, the calcium chloride produced has a tendency to tie up the water which is formed, thereby facilitating recovery of the desired product, and preventing the deleterious affect of water on the desired reaction. Moreover, hydrolysis of the methyl vinyl ether is prevented.

Specifically, under otherwise identical operating conditions, 15 to 18% less chlorine, by weight, is consumed when calcium oxide of the required particle size is used in place of sodium hydroxide. Calcium oxide is cheaper than sodium hydroxide, and 28 to 30% less, by weight, is required. Concomitant with these economies in raw material consumption is an average increase in yield of the desired product of 16 to 20%.

Because of the low solubility of calcium oxide in methanol, the entire amount of calcium oxide can be added to the methanol as rapidly as desired, at the start of the reaction without any special provisions for cooling. In contrast, when sodium hydroxide is used, it must be added slowly to the methanol with good agitation and provision for removing the large amount of heat which is evolved in the heat of solution. This extends the batch cycle time considerably, and increases manufacturing costs.

Furthermore, when calcium oxide is used, the formation of chloroform is avoided, whereas with sodium hydroxide, a significant amount of chloroform is produced. This undesirable by-product not only wastefully consumes raw materials, but its presence complicates the purification and recovery of the excess methanol and the desired product. When chloroform is present, fractional distillation of the crude reaction mixture involves the initial separation of a low boiling (40°–64° C.) chloroform cut contaminated with methanol. This cut must be collected separately in a separator to which water must be added in order to free it from methanol. The chloroform layer must then be separated from the aqueous methanol layer. The remaining reaction mixture, consisting mainly of methanol, dimethyl chloroacetal, and higher boiling residues, is separated by simple fractional distillation. In contrast, when chloroform is absent, the entire reaction mixture is separated by simple fractional distillation without the need for a special separator for recovery of chloroform.

This shortens the distillation time and simplifies the equipment requirements, with resultant cost reduction.

The reaction is preferably conducted in an excess of the alcohol, as a solvent, and at a low temperature. While temperatures as low as −60° C. may be employed, there is no particular advantage in employing temperatures much below 0° C. and a temperature range of 0° to −5° is therefore preferred. Temperatures above 5° C. are to be avoided since there is danger of forming explosive hypochlorite.

The following examples are illustrative of the present invention and are not to be regarded as limitative. It is to be understood that all parts, percentages and proportions referred to herein and in the appended claims are by weight unless otherwise indicated.

EXAMPLE I

Methyl vinyl ether (4.8 moles) was added to a well agitated, finely divided dispersion of 210 grams (3.75 moles) of calcium oxide, having a particle size so that 100% of the calcium oxide will pass a 200 mesh screen, in 62 moles of methanol. Chlorine, 363 grams (5.12 moles), was then added at such a rate and with cooling so as to maintain the temperature at 0° C. The total reaction time was 165 minutes. The crude product was then distilled into three cuts: methanol, intermediate, and steam distilled dimethyl chloroacetal. The wet, crude dimethyl chloroacetal was then distilled to yield a forerun and 456 grams of pure dimethyl chloroacetal (76.3% of theory). Moreover, only a trace of chloroform $CHCl_3$ was formed.

EXAMPLE II

Example I was repeated using 355 grams (5.0 moles) of chlorine and the total reaction time amounted to 153 minutes. Again there was only a trace of chloroform formed while the product dimethyl chloroacetal amounted to 446 grams (74.6% of theory).

EXAMPLE III

By way of comparison, the process of Example I was repeated using the general alkali, sodium hydroxide. Methyl vinyl ether (4.8 moles) was added to a well-agitated solution of 300 grams (7.5 moles) of sodium hydroxide in 62 moles of methanol. Chlorine, 425 grams (6.0 moles) was then added at such a rate and cooled with brine so as to maintain the temperature at −5° to 0° C. The total reaction time was 195 minutes. The yield of dimethyl chloroacetal recovered as in Example I amounted to 366 grams (61.2% of theory). Moreover, 22.5 ccs. of chloroform, $CHCl_3$ were formed.

EXAMPLE IV

As illustrative of a plant procedure, 7170 pounds (224 moles) of methanol is charged to a chlorinator. The agitator is turned on and 628 pounds (11.2 moles) of calcium oxide −200 mesh are added rapidly. The kettle is then closed, purged with nitrogen and cooled to −5° C. with brine. From a measuring tank 1085 pounds (18.7 moles) of methyl vinyl ether are added. Controlling the temperature at 0° C. so as not to allow the temperature to go above +1° C., approximately 1260 pounds (17.7 moles) of chlorine gas from cylinders are added, care being taken to see that no explosive hypochlorite is formed. The batch is stirred for one-half hour after addition of chlorine is completed and is then transferred to a storage or distillation kettle. The plant process yields about 1865 pounds of dimethyl chloroacetal corresponding to a theoretical yield of about 80%. In contrast, in similar sized runs, in the same equipment under the same conditions but using sodium hydroxide as the alkali, the yield of dimethyl chloroacetal varied from about 1560 to 1630 pounds or 67 to 70% of theory.

Various modifications and variations of this invention will be obvious to a worker skilled in the art and it is understood that such modfications and variations are to be included within the purview of this application and the spirit and scope of the appended claims.

I claim:

1. In a process of producing acetals of β-haloaldehydes which comprises reacting at a temperature of from −60° C. to 5° C. an α,β-ethylenically unsaturated ether selected from the group consisting of alkyl- and aryl-α,β-ethylenically unsaturated ethers of the formula

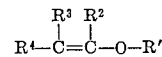

wherein R′ represents a member of the group consisting of alkyl and aryl radicals and $R^2$, $R^3$ and $R^4$ represent a member of the group consisting of hydrogen and alkyl and aryl radicals, with an alkyl alcohol of from 1 to 18 carbon atoms, a halogen selected from the group consisting of chlorine and bromine and an alkaline agent, the improvement which comprises utilizing as the alkaline agent, calcium oxide in a particule size of 150 to 325 screen mesh.

2. The process according to claim 1 wherein the calcium oxide is in a particle size of 200 screen mesh.

3. The process according to claim 1 wherein the α,β-ethylenically unsaturated ether is a lower alkyl-α,β-ethylenically unsaturated ether.

4. The process according to claim 3 wherein the alkyl alcohol is methanol.

5. In a process of producing dimethyl chloroacetal which comprises reacting at a tempertaure of −60° C. to 5° C. methyl vinyl ether with methanol, chlorine and an alkaline agent, the improvement which comprises utilizing as the alkaline agent calcium oxide in a particle size of 200 screen mesh.

References Cited

UNITED STATES PATENTS 2,550,637  4/1951  Cophenhaver _____ 260—615

OTHER REFERENCES

Collier, Catalysis In Practice, Reinhold Publishing Corp., New York, 1957, pp. 11–16, TP156C35C6.

LEON ZITVER, *Primary Examiner.*

H. MARS, *Assistant Examiner.*